United States Patent
Zheng et al.

(10) Patent No.: US 11,333,379 B2
(45) Date of Patent: May 17, 2022

(54) AIR CONDITIONER CONTROLLING METHOD AND APPARATUS AND AIR CONDITIONER HAVING THE SAME

(71) Applicants: HEFEI MIDEA HEATING & VENTILATING EQUIPMENT CO., LTD., Hefei (CN); GD MIDEA HEATING & VENTILATING EQUIPMENT CO., LTD., Foshan (CN)

(72) Inventors: Chunyuan Zheng, Hefei (CN); Zhijun Tan, Hefei (CN); Kun Yang, Hefei (CN); Mingren Wang, Hefei (CN)

(73) Assignees: HEFEI MIDEA HEATING & VENTILATING EQUIPMENT CO., LTD., Hefei (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 251 days.

(21) Appl. No.: 16/620,143

(22) PCT Filed: Jun. 3, 2019

(86) PCT No.: PCT/CN2019/089851
§ 371 (c)(1),
(2) Date: Dec. 6, 2019

(87) PCT Pub. No.: WO2019/237959
PCT Pub. Date: Dec. 19, 2019

(65) Prior Publication Data
US 2020/0158361 A1    May 21, 2020

(30) Foreign Application Priority Data
Jun. 12, 2018   (CN) .......................... 201810603391.4

(51) Int. Cl.
*F24F 11/30* (2018.01)
*F24F 11/84* (2018.01)
(Continued)

(52) U.S. Cl.
CPC .............. *F24F 11/30* (2018.01); *F24F 11/64* (2018.01); *F24F 11/65* (2018.01); *F24F 11/84* (2018.01);
(Continued)

(58) Field of Classification Search
CPC .. F24F 11/30; F24F 11/84; F24F 11/64; F24F 11/65; F24F 2140/00
(Continued)

(56) References Cited

U.S. PATENT DOCUMENTS

| 5,050,396 A | 9/1991 | Ohkoshi et al. |
| 2007/0113568 A1* | 5/2007 | Jang ........................ F25B 41/31 62/222 |

(Continued)

FOREIGN PATENT DOCUMENTS

| CM | 102386200 A | 3/2012 |
| CN | 1243930 A | 2/2000 |

(Continued)

OTHER PUBLICATIONS

First Chinese Office Action from priority Chinese Application No. 201810968240.9 dated May 15, 2020.
(Continued)

*Primary Examiner* — Md Azad
(74) *Attorney, Agent, or Firm* — Dilworth & Barrese, LLP.; Michael J. Musella, Esq.

(57) ABSTRACT

The present disclosure discloses an air conditioner controlling method and apparatus, as well as an air conditioner having the same. The method includes: determining that an outdoor heat exchanger of the air conditioner runs in an
(Continued)

```
┌─────────────────────────────────────────────────────────────┐
│ determining that an outdoor heat exchanger of the air       │ S1
│ conditioner runs in an evaporator state                     │
└─────────────────────────────────────────────────────────────┘
                              │
                              ▼
┌─────────────────────────────────────────────────────────────┐
│ acquiring a state signal of a refrigerant of an indoor      │ S2
│ refrigerating unit                                          │
└─────────────────────────────────────────────────────────────┘
                              │
                              ▼
┌─────────────────────────────────────────────────────────────┐
│ adjusting an opening degree of an electronic expansion      │
│ valve of an outdoor unit according to the state signal of   │ S3
│ the indoor refrigerating unit                               │
└─────────────────────────────────────────────────────────────┘
``` evaporator state; acquiring a state signal of a refrigerant of an indoor refrigerating unit; and adjusting an opening degree of an electronic expansion valve of an outdoor unit according to the state signal of the indoor refrigerating unit. This method may adjust the opening degree of the electronic expansion valve of the outdoor unit according to the state signal of the indoor refrigerating unit when the outdoor heat exchanger of the air conditioner runs in the evaporator state, thereby effectively improving the reliability of control, broadening the reliable operation range of the system, and reasonably distributing the refrigerant between the indoor refrigerating unit and the outdoor unit under a low temperature working condition.

19 Claims, 5 Drawing Sheets

(51) Int. Cl.
  *F24F 11/64* (2018.01)
  *F24F 11/65* (2018.01)
  *G05B 13/04* (2006.01)
  *F24F 140/00* (2018.01)
(52) U.S. Cl.
  CPC ........ *G05B 13/048* (2013.01); *F24F 2140/00* (2018.01)
(58) Field of Classification Search
  USPC .......................................................... 700/278
  See application file for complete search history.

(56) References Cited

U.S. PATENT DOCUMENTS

| | | | | |
|---|---|---|---|---|
| 2008/0023563 | A1* | 1/2008 | Tamura | F25B 13/00 236/67 |
| 2009/0044551 | A1* | 2/2009 | Kasahara | F25B 49/005 62/149 |
| 2010/0101264 | A1* | 4/2010 | Nishino | F24F 11/79 62/408 |
| 2011/0232311 | A1* | 9/2011 | Korenaga | F25B 13/00 62/222 |
| 2012/0050694 | A1 | 3/2012 | Huang et al. | |
| 2014/0373564 | A1* | 12/2014 | Nishimura | F25B 49/02 62/222 |
| 2015/0330689 | A1* | 11/2015 | Kato | F25B 49/022 62/115 |
| 2016/0377333 | A1* | 12/2016 | Bertagnolio | F25B 49/005 62/56 |
| 2018/0180337 | A1* | 6/2018 | Luo | F25B 13/00 |
| 2021/0033321 | A1* | 2/2021 | Liu | F25B 43/00 |

FOREIGN PATENT DOCUMENTS

| | | |
|---|---|---|
| CN | 1285488 A | 2/2001 |
| CN | 101191644 A | 6/2008 |
| CN | 101329093 A | 12/2008 |
| CN | 102353121 A | 2/2012 |
| CN | 102589048 A | 7/2012 |
| CN | 103398446 A | 11/2013 |
| CN | 104197570 A | 12/2014 |
| CN | 104266138 A | 1/2015 |
| CN | 204271141 U | 4/2015 |
| CN | 105066539 A | 11/2015 |
| CN | 105588284 A | 5/2016 |
| CN | 107146835 A | 6/2017 |
| CN | 107024027 A | 8/2017 |
| CN | 107195654 A | 9/2017 |
| CN | 107940826 A | 4/2018 |
| CN | 107940827 A | 4/2018 |
| CN | 108759008 A | 11/2018 |
| JP | H046367 A | 1/1992 |
| JP | H0484079 A | 3/1992 |
| JP | H0835710 A | 2/1996 |
| JP | H11201573 A | 7/1999 |
| JP | 2000174327 A | 6/2000 |
| KR | 100680496 B1 | 2/2007 |
| KR | 20090067739 A | 6/2009 |
| KR | 20140000936 A | 1/2014 |

OTHER PUBLICATIONS

Weibiao, "Microdisplay technology based on group III nitride wide band gap semiconductor", Journal, p. 15-16, Dec. 2001.
OA 2 for CN Application 201810603391.4.
English translation of OA for CN application 201810603391.4.
Chinese Office Action dated Aug. 26, 2019.
International Search Report and Written Opinion dated Aug. 22, 2019 from State Intellectual Property Office of the P.R. China.

* cited by examiner

AIR CONDITIONER CONTROLLING METHOD AND APPARATUS AND AIR CONDITIONER HAVING THE SAME

CROSS-REFERENCE TO RELATED APPLICATION

This application is a U.S. national stage filing of PCT/CN2019/089851 filed Jun. 3, 2019, and is based on and claims priority to Chinese Patent Application Serial No. 201810603391.4, filed with the National Intellectual Property Administration of P. R. China on Jun. 12, 2018, the entire content of each of which is incorporated herein by reference.

FIELD

The present disclosure relates to the technical field of air conditioners, and more particularly to an air conditioner controlling method and apparatus, and an air conditioner having the same.

BACKGROUND

At present, air conditioners sometimes need to run under a condition of high indoor temperature and low outdoor temperature (such as −25° C. or lower) in some places, such as communication base stations, restaurants, bakeries, hotels, ballrooms and the like. These places commonly have a lot of heat sources, which make the indoor temperature higher. At the same time, these places have special requirements for the quality of indoor air, so outdoor low-temperature air cannot be directly introduced into the room, but need air conditioners to decrease the indoor temperature. However, a refrigeration mode of a conventional air conditioner generally runs under the outdoor temperature ranging from 7° C. to 43° C., but is disabled when the outdoor temperature is in a range of −25° C. to 0° C. or lower.

Similarly, for an evaporator, there is a huge difference in temperature between an outdoor side and an indoor side, and the outdoor temperature determines that low pressure will be lower. Under the condition of ensuring a comfortable refrigeration air supply temperature, as the low pressure is lower, the amount of a refrigerant required by an indoor refrigerating unit will be less than that required for the refrigeration under the normal temperature, that is, after heat exchanging, the refrigerant in the indoor refrigerating unit has a higher superheat degree, while an outdoor unit basically does not superheat. Therefore, under unit refrigerant flow, the refrigerant is prone to flow to the outdoor unit as flow resistance towards the outdoor unit is small When an opening degree of an electronic expansion valve of the outdoor unit is larger, the amount of the refrigerant flowing to the indoor refrigerating units will be less, which is easy to result in bias flow among the indoor refrigerating units. While when the opening degree of the electronic expansion valve of the outdoor unit is smaller, the amount of the refrigerant flowing to the indoor refrigerating unit is larger, and as the low pressure is lower, the indoor unit is easy to frost. The superheat degree required by the indoor refrigerating unit is larger, so current controlling methods with constant superheat degree are difficult to adapt to such application scenarios.

In the related art, the most intuitive way to judge whether the refrigerant in the indoor refrigerating unit is sufficient or not is based on a temperature difference between air supply temperature and air return temperature, as well as set temperature. It is often considered that the judgment on the outlet air temperature by an air temperature sensor is inaccurate due to uneven temperature distribution, or setting the air temperature sensor increases product cost. Therefore, currently, under a normal temperature condition, an air supply temperature range of the indoor refrigerating unit is judged through temperature in a middle part of a heat exchanger. However, in a low temperature hybrid mode, because the low pressure of the system is lower, the judging method using the temperature in the middle part of the heat exchanger fails, which needs to be solved.

SUMMARY

Embodiments of the present disclosure seek to solve at least one of the problems existing in the related art to at least some extent.

For this, a first objective of the present disclosure is to provide an air conditioner controlling method, which can adjust an opening degree of an electronic expansion valve of an outdoor unit according to a state signal of an indoor refrigerating unit when an outdoor heat exchanger of the air conditioner runs in an evaporator state, effectively improve the reliability of control, broaden the reliable operation range of the system, and reasonably distribute the refrigerant between the indoor refrigerating unit and the outdoor unit under a low temperature working condition.

A second objective of the present disclosure is to provide an air conditioner controlling apparatus.

A third objective of the present disclosure is to provide an air conditioner.

A fourth objective of the present disclosure is to provide an electronic device.

A fifth objective of the present disclosure is to provide a non-transitory computer-readable storage medium.

For achieving the above objectives, according to embodiments of a first aspect of the present disclosure, there is provided an air conditioner controlling method. The air conditioner runs in a low temperature hybrid mode. The method includes:

determining that an outdoor heat exchanger of the air conditioner runs in an evaporator state;

acquiring a state signal of a refrigerant of an indoor refrigerating unit; and adjusting an opening degree of an electronic expansion valve of an outdoor unit according to the state signal of the indoor refrigerating unit.

With the air conditioner controlling method according to embodiments of the present disclosure, it can be determined that the outdoor heat exchanger of the air conditioner runs in the evaporator state, the state signal of the refrigerant of the indoor refrigerating unit is acquired, and the opening degree of the electronic expansion valve of the outdoor unit is adjusted according to the state signal of the indoor refrigerating unit, thereby effectively improving the reliability of control, broadening the reliable operation range of the system, and reasonably distributing the refrigerant between the indoor refrigerating unit and the outdoor unit under a low temperature working condition.

In an embodiment of the present disclosure, the adjusting an opening degree of an electronic expansion valve of an outdoor unit according to the state signal of the indoor refrigerating unit includes:

acquiring a first proportion, relative to all indoor refrigerating units, of an indoor refrigerating unit which transmits a first state signal indicating insufficient refrigerant;

detecting and confirming that a first duration during which the first proportion is greater than a preset first proportion threshold exceeds a preset first duration;

detecting and confirming that a second duration during which all indoor refrigerating units transmit a second state signal indicating excessive refrigerant exceeds a preset second duration; and controlling the opening degree of the electronic expansion valve of the outdoor unit to be reduced.

In an embodiment of the present disclosure, the air conditioner controlling method as described above further includes:

acquiring a second proportion, relative to all indoor refrigerating units, of an indoor refrigerating unit which transmits a third state signal indicating excessive refrigerant, when it is detected and confirmed that the followings are not met at the same time:

the first duration during which the first proportion is greater than the preset first proportion threshold exceeds the preset first duration, and the second duration during which all indoor refrigerating units transmit the second state signal exceeds the preset second duration;

detecting and confirming that a third duration during which the second proportion is greater than a preset second proportion threshold exceeds a preset third duration;

detecting and confirming that a fourth duration during which all indoor refrigerating units transmit a fourth state signal indicating insufficient refrigerant exceeds a preset fourth duration;

detecting and confirming that an exhaust superheat degree of the air conditioner is greater than a preset superheat threshold; and controlling the opening degree of the electronic expansion valve of the outdoor unit to be increased.

In an embodiment of the present disclosure, the air conditioner controlling method as described above further includes:

controlling a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

In an embodiment of the present disclosure, the acquiring a state signal of a refrigerant of an indoor refrigerating unit includes:

acquiring a state parameter for identifying a state of the refrigerant; and controlling the indoor refrigerating unit to transmit the state signal according to the state parameter, the state parameter at least includes an air supply temperature of the air conditioner.

In an embodiment of the present disclosure, the controlling the indoor refrigerating unit to transmit the state signal according to the state parameter includes:

matching the state parameter with each of at least one preset state identifying strategy; and controlling the indoor refrigerating unit to transmit the state signal according to a match result of matching the state parameter with each state identifying strategy.

In an embodiment of the present disclosure, the air conditioner controlling method as described above further includes:

detecting and confirming that a first state signal is triggered under a first preset state identifying strategy, and that a duration of the first state signal exceeds a preset fifth duration;

controlling a current target superheat degree to be reduced when it is detected and confirmed that the duration of the first state signal exceeds the preset fifth duration until a fourth state signal is triggered by the first preset state identifying strategy or the first state signal is triggered by a second preset state identifying strategy;

detecting and confirming that a second state signal is triggered under a third preset state identifying strategy, and that a duration of the second state signal exceeds a preset sixth duration; and controlling the current target superheat degree to be increased when it is detected and confirmed that the duration of the second state signal exceeds the preset sixth duration until a third state signal is triggered by the third preset state identifying strategy or the second state signal is triggered by a fourth preset state identifying strategy.

In an embodiment of the present disclosure, the air conditioner controlling method as described above further includes:

identifying that the state parameter is matched with each of the at least one preset state identifying strategy;

detecting and confirming that the state parameter is matched with both of the first preset state identifying strategy and the second preset state identifying strategy for triggering the first state signal, acquiring priority levels of the first preset state identifying strategy and the second preset state identifying strategy, and controlling a first state signal triggered by a state identifying strategy with a higher priority level to be transmitted;

detecting and confirming that the state parameter is matched with both of the third preset state identifying strategy and the fourth preset state identifying strategy for triggering the third state signal, acquiring priority levels of the third preset state identifying strategy and the fourth preset state identifying strategy, and controlling a third state signal triggered by a state identifying strategy with a higher priority level to be transmitted, the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

In an embodiment of the present disclosure, the air conditioner controlling method as described above further includes:

acquiring an entry temperature of the refrigerant;

controlling to start an indoor unit anti-freezing process when it is detected and confirmed that the entry temperature is less than or equal to a first preset temperature threshold and the state signal is not a refrigerant excessive state signal;

continuously detecting the entry temperature, and controlling to stop the indoor unit anti-freezing process when it is detected and confirmed that the entry temperature is greater than or equal to a second preset temperature threshold or the state signal is a refrigerant insufficient state signal, the refrigerant excessive state signal includes the second state signal and the third state signal, and the refrigerant insufficient state signal includes the first state signal and the fourth state signal.

In an embodiment of the present disclosure, the air conditioner controlling method as described above further includes:

collecting sample data, and training a predicting model constructed for predicting the air supply temperature with the sample data to obtain a target predicting model; and collecting prediction data for predicting the air supply temperature, and inputting the prediction data into the target predicting model so as to obtain the air supply temperature.

For achieving the above objectives, according to embodiments of a second aspect of the present disclosure, there is provided an air conditioner controlling apparatus. The air conditioner runs in a low temperature hybrid mode. The apparatus includes:

a determining module, configured to determine that an outdoor heat exchanger of the air conditioner runs in an evaporator state;

an acquiring module, configured to acquire a state signal of a refrigerant of an indoor refrigerating unit; and an adjusting module, configured to adjust an opening degree of an electronic expansion valve of an outdoor unit according to the state signal of the indoor refrigerating unit.

With the air conditioner controlling apparatus according to embodiments of the present disclosure, it can be determined by the determining module that the outdoor heat exchanger of the air conditioner runs in the evaporator state, the state signal of the refrigerant of the indoor refrigerating unit is acquired by the acquiring module, and the opening degree of the electronic expansion valve of the outdoor unit is adjusted by the adjusting module according to the state signal of the indoor refrigerating unit, thereby effectively improving the reliability of control, effectively reducing costs of the indoor refrigerating unit, and efficiently save resources. Moreover, these operations are easy to be implemented.

In an embodiment of the present disclosure, the adjusting module is specifically configured to:

acquire a first proportion, relative to all indoor refrigerating units, of an indoor refrigerating unit which transmits a first state signal indicating insufficient refrigerant;

detect and confirm that a first duration during which the first proportion is greater than a preset first proportion threshold exceeds a preset first duration;

detect and confirm that a second duration during which all indoor refrigerating units transmit a second state signal indicating excessive refrigerant exceeds a preset second duration; and control the opening degree of the electronic expansion valve of the outdoor unit to be reduced.

In an embodiment of the present disclosure, the adjusting module is further configured to:

acquire a second proportion, relative to all indoor refrigerating units, of an indoor refrigerating unit which transmits a third state signal indicating excessive refrigerant, when it is detected and confirmed that the followings are not met at the same time:

the first duration during which the first proportion is greater than the preset first proportion threshold exceeds the preset first duration, and the second duration during which all indoor refrigerating units transmit the second state signal exceeds the preset second duration;

detect and confirm that a third duration during which the second proportion is greater than a preset second proportion threshold exceeds a preset third duration;

detect and confirm that a fourth duration during which all indoor refrigerating units transmit a fourth state signal indicating insufficient refrigerant exceeds a preset fourth duration;

detect and confirm that an exhaust superheat degree of the air conditioner is greater than a preset superheat threshold; and control the opening degree of the electronic expansion valve of the outdoor unit to be increased.

In an embodiment of the present disclosure, the adjusting module is further configured to:

control a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

In an embodiment of the present disclosure, the acquiring module includes:

a parameter acquiring unit, configured to acquire a state parameter for identifying a state of the refrigerant; and a signal transmitting unit, configured to control the indoor refrigerating unit to transmit the state signal according to the state parameter, the state parameter at least includes an air supply temperature of the air conditioner.

In an embodiment of the present disclosure, the signal transmitting unit is configured to:

match the state parameter with each of at least one preset state identifying strategy; and control the indoor refrigerating unit to transmit the state signal according to a match result of matching the state parameter with each state identifying strategy.

In an embodiment of the present disclosure, the air conditioner controlling apparatus as described above further includes: a superheat adjusting module configured to:

detect and confirm that a first state signal is triggered under a first preset state identifying strategy, and that a duration of the first state signal exceeds a preset fifth duration;

control a current target superheat degree to be reduced when it is detected and confirmed that the duration of the first state signal exceeds the preset fifth duration until a fourth state signal is triggered by the first preset state identifying strategy or the first state signal is triggered by a second preset state identifying strategy;

detect and confirm that a second state signal is triggered under a third preset state identifying strategy, and that a duration of the second state signal exceeds a preset sixth duration; and control the current target superheat degree to be increased when it is detected and confirmed that the duration of the second state signal exceeds the preset sixth duration until a third state signal is triggered by the third preset state identifying strategy or the second state signal is triggered by a fourth preset state identifying strategy.

In an embodiment of the present disclosure, the signal transmitting unit is further configured to:

identify that the state parameter is matched with each of the at least one preset state identifying strategy;

detect and confirm that the state parameter is matched with both of the first preset state identifying strategy and the second preset state identifying strategy for triggering the first state signal, acquire priority levels of the first preset state identifying strategy and the second preset state identifying strategy, and control a first state signal triggered by a state identifying strategy with a higher priority level to be transmitted; or detect and confirm that the state parameter is matched with both of the third preset state identifying strategy and the fourth preset state identifying strategy for triggering the third state signal, acquire priority levels of the third preset state identifying strategy and the fourth preset state identifying strategy, and control a third state signal triggered by a state identifying strategy with a higher priority level to be transmitted, the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

In an embodiment of the present disclosure, the air conditioner controlling apparatus as described above further includes: an anti-freezing controlling module, configured to:

acquire an entry temperature of the refrigerant;

control to start an indoor unit anti-freezing process when it is detected and confirmed that the entry temperature is less than or equal to a first preset temperature threshold and the state signal is not a refrigerant excessive state signal;

continuously detect the entry temperature, and control to stop the indoor unit anti-freezing process when it is detected and confirmed that the entry temperature is greater than or equal to a second preset temperature threshold or the state signal is a refrigerant insufficient state signal, the refrigerant excessive state signal includes the second state signal and the third state signal, and the refrigerant insufficient state signal includes the first state signal and the fourth state signal.

In an embodiment of the present disclosure, the air conditioner controlling apparatus as described above further includes: an air supply temperature predicting model, configured to:

collect sample data, and train a predicting model constructed for predicting the air supply temperature with the sample data to obtain a target predicting model; and collect prediction data for predicting the air supply temperature, and input the prediction data into the target predicting model so as to obtain the air supply temperature.

For achieving the above objectives, according to embodiments of a third aspect of the present disclosure, there is provided an air conditioner, including the air conditioner controlling apparatus according to any embodiment of the second aspect of the present disclosure.

With the air conditioner according to embodiments of the present disclosure, it can be determined by the determining module that the outdoor heat exchanger of the air conditioner runs in the evaporator state, the state signal of the refrigerant of the indoor refrigerating unit is acquired by the acquiring module, and the opening degree of the electronic expansion valve of the outdoor unit is adjusted by the adjusting module according to the state signal of the indoor refrigerating unit, thereby effectively improving the reliability of control, effectively reducing costs of the indoor refrigerating unit, and efficiently save resources. Moreover, these operations are easy to be implemented.

For achieving the above objectives, according to embodiments of a fourth aspect of the present disclosure, there is provided an electronic device, including: a processor; and a memory. The processor is configured to read an executable program code stored in the memory and execute a program corresponding to the executable program code, so as to implement the air conditioner controlling method according to any embodiment of the first aspect of the present disclosure.

With the electronic device according to embodiments of the present disclosure, when the program corresponding to the air conditioner controlling method stored therein is executed, the reliability of control may be effectively improved, costs of the indoor refrigerating unit may be effectively reduced, resources may be efficiently saved, and the air conditioner controlling method is easy to be implemented.

For achieving the above objectives, according to embodiments of a fifth aspect of the present disclosure, there is provided a non-transitory computer-readable storage medium having stored therein a computer program that, when executed by a processor, causes the air conditioner controlling method according to any embodiment of the first aspect of the present disclosure to be performed.

With the non-transitory computer-readable storage medium according to embodiments of the present disclosure, when the program corresponding to the air conditioner controlling method stored therein is executed, the reliability of control may be effectively improved, costs of the indoor refrigerating unit may be effectively reduced, resources may be efficiently saved, and the air conditioner controlling method is easy to be implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
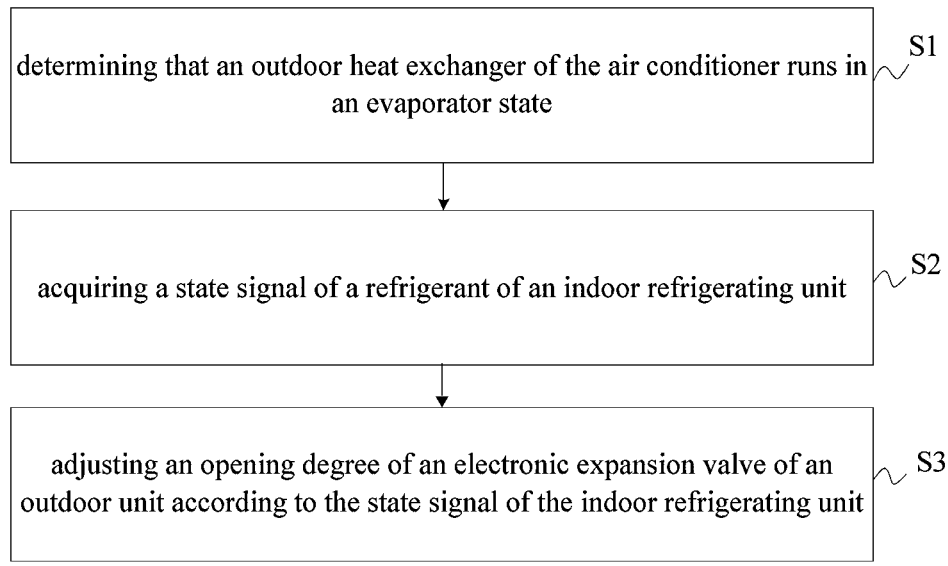
FIG. 1 is a flowchart of an air conditioner controlling method according to some embodiments of the present disclosure.

Embodiments of the present disclosure will be described in detail below, examples of which are illustrated in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure, and shall not be construed to limit the present disclosure.

In the following, an air conditioner controlling method and apparatus, as well as an air conditioner having the same according to embodiments of the present disclosure will be described with reference to the accompanying drawings. The air conditioner controlling method according to embodiments of the present disclosure will be described first with reference to the accompanying drawings.

FIG. 1 is a flowchart of an air conditioner controlling method according to some embodiments of the present disclosure.

The air conditioner provided according to embodiments of the present disclosure needs to run in a low temperature hybrid mode. In the case of low temperature refrigeration, there also have indoor heating demands due to relatively low outdoor temperature. Therefore, the low temperature refrigeration is often accompanied by heating, that is, a system is often in an operation state of both heating and refrigerating in this situation.

As illustrated in FIG. 1, the air conditioner controlling method includes the following steps.

At S1, it is determined that an outdoor heat exchanger of the air conditioner runs in an evaporator state.

In the low temperature hybrid mode, the outdoor heat exchanger of the air conditioner will switch between a condenser and an evaporator according to loads of indoor refrigerating and heating. When outdoor temperature is low, the heating load is usually greater than the refrigerating load, so that the outdoor heat exchanger will mostly be in the evaporator state. Therefore, before adjusting an opening degree of an electronic expansion valve of an outdoor unit, it needs to determine that the outdoor heat exchanger of the air conditioner runs in the evaporator state.

At S2, a state signal of a refrigerant of an indoor refrigerating unit is acquired.

Specifically, the state signal of the refrigerant of the indoor refrigerating unit may be determined according to the amount of the refrigerant in the indoor refrigerating unit. The state signal of the refrigerant includes a refrigerant insufficient state signal and a refrigerant excessive state signal.

At S3, an opening degree of an electronic expansion valve of an outdoor unit is adjusted according to the state signal of the indoor refrigerating unit.

Specifically, when the system starts the low temperature hybrid mode and the outdoor heat exchanger runs in the evaporator state, the opening degree of the electronic expansion valve of the outdoor unit may be adjusted according to judgements on the refrigerant insufficient state signal and the refrigerant excessive state signal of the indoor refrigerating unit.

Therefore, with the air conditioner controlling method according to some embodiments of the present disclosure, by determining that the outdoor heat exchanger of the air conditioner runs in the evaporator state; acquiring the state signal of the refrigerant of the indoor refrigerating unit; and adjusting the opening degree of the electronic expansion valve of the outdoor unit according to the state signal of the indoor refrigerating unit, i.e., dynamically adjusting the opening degree of the electronic expansion valve according to the amount of the refrigerant in the indoor refrigerating unit, thereby making the opening degree of the electronic expansion valve automatically adaptive to the amount of the refrigerant in the indoor refrigerating unit, which effectively improves the reliability of the control, effectively reduces costs of the indoor refrigerating unit, and effectively saves resources. Moreover, the method is easy to be implemented.

Figure 2:
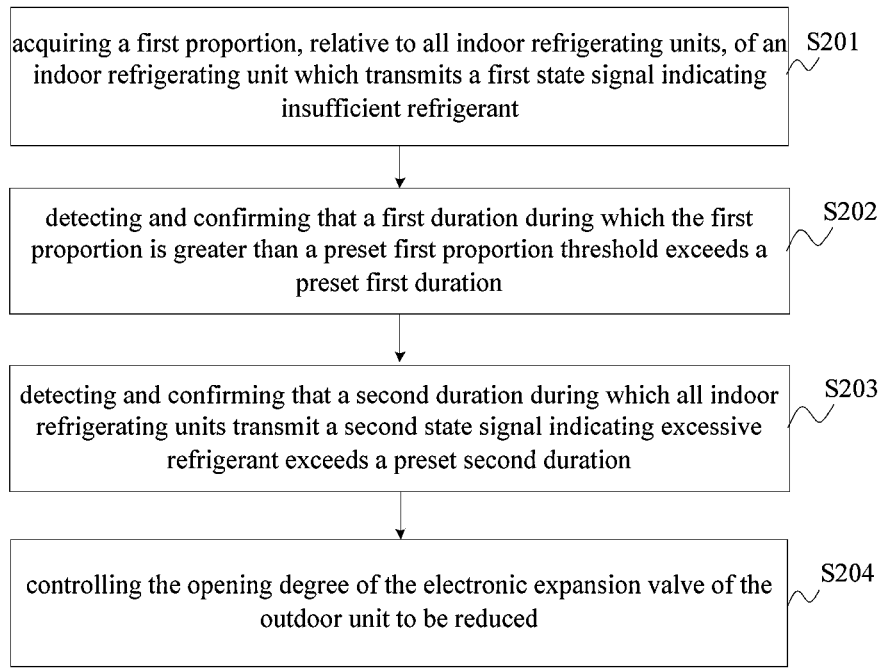
FIG. 2 is a flowchart of an air conditioner controlling method according to an embodiment of the present disclosure.

In an embodiment of the present disclosure, as shown in FIG. 2, the adjusting an opening degree of an electronic expansion valve of an outdoor unit according to the state signal of the indoor refrigerating unit as described in the above method specifically includes the following steps.

At S201, a first proportion, relative to all indoor refrigerating units, of an indoor refrigerating unit which transmits a first state signal indicating insufficient refrigerant is acquired.

Specifically, when the system starts the low temperature hybrid mode and the outdoor heat exchanger runs in the evaporator state, the opening degree of the electronic expansion valve of the outdoor unit may be adjusted according to judgements on the refrigerant insufficient state signal and the refrigerant excessive state signal of the indoor refrigerating unit. Therefore, the first proportion, relative to all indoor refrigerating units, of the indoor refrigerating unit which transmits the first state signal indicating insufficient refrigerant may be acquired first. For example, the signal indicating that the refrigerant is insufficient may be ON, and the first proportion may be X %.

At S202, it is detected and confirmed that a first duration during which the first proportion is greater than a preset first proportion threshold exceeds a preset first duration.

Specifically, when the first proportion X %, relative to all indoor refrigerating units, of the indoor refrigerating unit which transmits the first state signal indicating insufficient refrigerant is greater than the preset first proportion threshold, it is determined whether the first duration during which the first proportion is greater than the preset first proportion threshold exceeds the preset first duration. For example, the preset first duration is β min.

If it is determined that the first duration during which the first proportion is greater than the preset first proportion threshold exceeds the preset first duration, step S203 will be executed. The preset first proportion threshold and the preset first duration may be designed by those skilled in the art as required, which will not be specifically limited herein.

At S203, it is detected and confirmed that a second duration during which all indoor refrigerating units transmit a second state signal indicating excessive refrigerant exceeds a preset second duration.

Specifically, when all indoor refrigerating units transmit the second state signal indicating the excessive refrigerant (for example, the signal indicating that the refrigerant is excessive may be OFF), it is determined whether the second duration during which all indoor refrigerating units transmit the second state signal indicating excessive refrigerant exceeds the preset second duration.

If it is determined that the second duration during which all indoor refrigerating units transmit the second state signal indicating excessive refrigerant exceeds the preset second duration, step S204 will be executed.

It will be appreciated that the preset second duration may be designed by those skilled in the art as required, which will not be specifically limited herein.

At S204, it is controlled to reduce the opening degree of the electronic expansion valve of the outdoor unit.

Specifically, when the first duration during which the first proportion is greater than the preset first proportion threshold exceeds the preset first duration, and the second duration during which all indoor refrigerating units transmit the second state signal exceeds the preset second duration, the opening degree of the electronic expansion valve of the outdoor unit may be controlled to reduce, for example, the opening degree of the electronic expansion valve of the outdoor unit is reduced by ωPls, so as to effectively avoid the refrigerant bias among the indoor refrigerating units due to less refrigerant in the indoor unit caused by that the opening degree of the electronic expansion valve of the outdoor unit is too large, under various working conditions.

Figure 3:
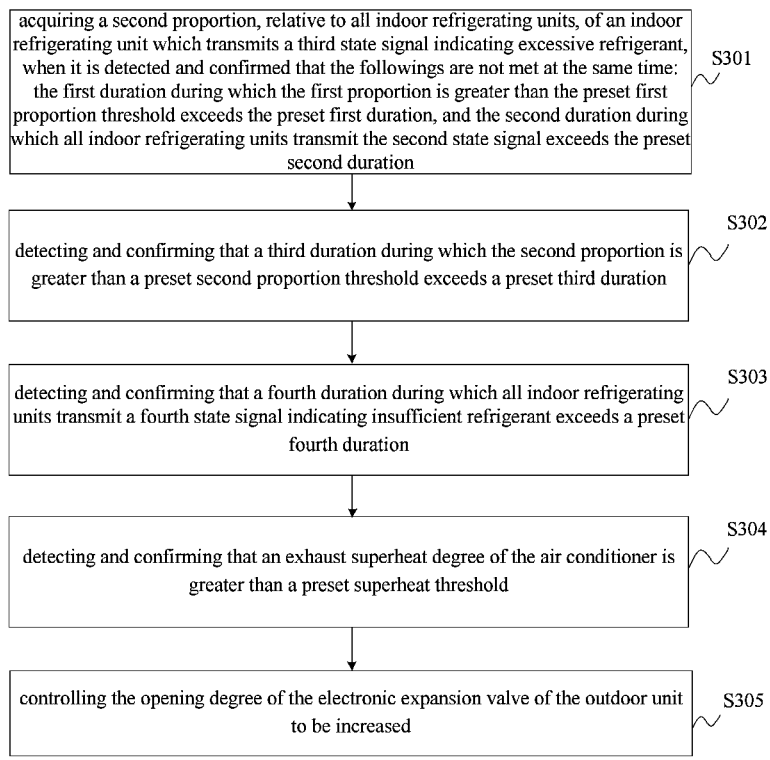
FIG. 3 is a flowchart of an air conditioner controlling method according to another embodiment of the present disclosure.

In an embodiment of the present disclosure, as shown in FIG. 3, the air conditioner controlling method as described above further includes the following steps.

At S301, a second proportion, relative to all indoor refrigerating units, of an indoor refrigerating unit which transmits a third state signal indicating excessive refrigerant is acquired, when it is detected and confirmed that the followings are not met at the same time:

the first duration during which the first proportion is greater than the preset first proportion threshold exceeds the preset first duration, and the second duration during which all indoor refrigerating units transmit the second state signal exceeds the preset second duration.

Specifically, the second proportion, relative to all indoor refrigerating units, of the indoor refrigerating unit which transmits the third state signal indicating excessive refrigerant (for example, the signal indicating that the refrigerant is excessive is ON) may be acquired, when the followings are not met at the same time: the first duration during which the first proportion is greater than the preset first proportion threshold exceeds the preset first duration, and the second duration during which all indoor refrigerating units transmit the second state signal exceeds the preset second duration. For example, the second proportion may be Y %.

At S302, it is detected and confirmed that a third duration during which the second proportion is greater than a preset second proportion threshold exceeds a preset third duration.

When the second proportion Y %, relative to all indoor refrigerating units, of the indoor refrigerating unit which transmits the third state signal indicating excessive refrigerant is greater than the preset second proportion threshold, it is determined whether the third duration during which the second proportion is greater than the preset second proportion threshold exceeds the preset third duration. For example, the preset third duration is β min.

If it is determined that the third duration during which the second proportion is greater than the preset second proportion threshold exceeds the preset third duration, S303 will be executed; otherwise, S306 will be executed.

It will be appreciated that, the preset second proportion threshold and the preset third duration may be designed by those skilled in the art as required, which will not be specifically limited herein.

At S303, it is detected and confirmed that a fourth duration during which all indoor refrigerating units transmit a fourth state signal indicating insufficient refrigerant exceeds a preset fourth duration.

Specifically, when all indoor refrigerating units transmit the fourth state signal indicating insufficient refrigerant, for example, the signal indicating that the refrigerant is insufficient is OFF, it is further determined whether the fourth duration during which all indoor refrigerating units transmit the fourth state signal indicating insufficient refrigerant exceeds the preset fourth duration.

If it is determined that the fourth duration during which all indoor refrigerating units transmit the fourth state signal indicating insufficient refrigerant exceeds the preset fourth duration, S304 will be executed; otherwise, S306 will be executed.

It will be appreciated that, the preset fourth duration may be designed by those skilled in the art as required, which will not be specifically limited herein.

At S304, it is detected and confirmed that an exhaust superheat degree of the air conditioner is greater than a preset superheat threshold.

Further, it also needs to acquire the exhaust superheat degree of the air conditioner and compare the exhaust superheat degree of the air conditioner with the preset superheat threshold. If it is determined that the exhaust superheat degree of the air conditioner is greater than the preset superheat threshold, S305 will be executed; otherwise, S306 will be executed.

The preset superheat threshold may be 0° C., which may be designed by those skilled in the art as required, and will not be specifically limited herein.

At S305, it is controlled to increase the opening degree of the electronic expansion valve of the outdoor unit.

Specifically, when the followings are met at the same time: the third duration during which the second proportion is greater than the preset second proportion threshold exceeds the preset third duration, the fourth duration during which all indoor refrigerating units transmit the fourth state signal indicating insufficient refrigerant exceeds the preset fourth duration, and the exhaust superheat degree of the air conditioner is greater than 0° C., the opening degree of the electronic expansion valve of the outdoor unit may be controlled to increase, for example, the opening degree of the electronic expansion valve of the outdoor unit is increased by ωPls, so as to effectively avoid problems that the refrigerant in the indoor refrigerating unit is excessive and air supply temperature is too low due to that the opening degree of the electronic expansion valve of the outdoor unit is too small, under various working conditions.

In an embodiment of the present disclosure, the air conditioner controlling method as described above further includes: controlling a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

Specifically, if the followings are not met at the same time: the third duration during which the second proportion is greater than the preset second proportion threshold exceeds the preset third duration, the fourth duration during which all indoor refrigerating units transmit the fourth state signal indicating insufficient refrigerant exceeds the preset fourth duration, and the exhaust superheat degree is greater than 0° C., it will be controlled to maintain the current opening degree of the electronic expansion valve of the outdoor unit, i.e., the opening degree of the electronic expansion valve of the outdoor unit will be kept unchanged.

In an embodiment of the present disclosure, the acquiring a state signal of a refrigerant of an indoor refrigerating unit includes: acquiring a state parameter for identifying a state of the refrigerant; and controlling the indoor refrigerating unit to transmit the state signal according to the state parameter. The state parameter at least includes an air supply temperature of the air conditioner.

Specifically, the state parameter for identifying the state of the refrigerant includes: an opening degree of an electronic expansion valve of the indoor refrigerating unit; air return temperature of the air conditioner, air supply temperature of the air conditioner and a first temperature difference between the air return temperature and the air supply temperature of the air conditioner; as well as a second temperature difference between the air return temperature and set refrigerating temperature of the air conditioner.

The state signal includes a refrigerant insufficient state signal and a refrigerant excessive state signal. The refrigerant insufficient state signal includes the first state signal and the fourth state signal indicating the insufficient refrigerant. The refrigerant excessive state signal includes the third state signal and the second state signal indicating the excessive refrigerant.

In an embodiment of the present disclosure, the controlling the indoor refrigerating unit to transmit the state signal according to the state parameter includes:

matching the state parameter with each of at least one preset state identifying strategy; and controlling the indoor refrigerating unit to transmit the state signal according to a match result of matching the state parameter with each state identifying strategy.

The generation of the state signal will be explained and illustrated below with reference to specific example.

(1) The indoor refrigerating unit may be controlled to transmit the first state signal according to the opening degree of the electronic expansion valve of the indoor refrigerating unit; the air return temperature of the air conditioner, the air supply temperature of the air conditioner, and the first temperature difference between the air return temperature and the air supply temperature of the air conditioner; as well as the second temperature difference between the air return temperature and the set refrigerating temperature of the air conditioner, i.e., when the following 3 formulas are met:

opening degree of the electronic expansion valve (EXV) of the indoor refrigerating unit$\geq \lambda_1 pls$, $T_{en} - T_{d,pre} < \chi - 2°$ C., $T_{en} - T_s \geq 2°$ C.

Alternatively, the indoor refrigerating unit may be controlled to transmit the first state signal according to the air return temperature of the air conditioner, the air supply temperature of the air conditioner, and the first temperature difference between the air return temperature and the air supply temperature of the air conditioner; as well as the second temperature difference between the air return temperature and the set refrigerating temperature of the air conditioner, i.e., when the following 2 formulas are met at the same time:

$T_{en} - T_{d,pre} < \chi - 2°$ C., and lasting for $\varepsilon$ min or more;

$T_e - T_s \geq 2°$ C., where $T_{en}$ represents the air return temperature, $T_{d,pre}$ represents predicted air supply temperature, and $T_s$ represents the set refrigerating temperature of the indoor unit.

(2) The indoor refrigerating unit may be controlled to transmit the second state signal according to the opening degree of the electronic expansion valve of the indoor refrigerating unit; and the air return temperature of the air conditioner, i.e., when the following 2 formulas are met:

the opening degree of the EXV of the indoor refrigerating unit$\geq \lambda_2 + \tau_2 pls$, $T_{d,pre} \geq \xi 2°$ C.

Alternatively, the indoor refrigerating unit may be controlled to transmit the second state signal according to the opening degree of the electronic expansion valve of the indoor refrigerating unit; and the air return temperature of the air conditioner, i.e., when the following formula is met at the same time:

$T_{d,pre} \geq \xi + 2°$ C., and lasting for $\varepsilon$ min or more;

where $T_{d,pre}$ represents the predicted air supply temperature.

(3) The indoor refrigerating unit may be controlled to transmit the third state signal according to the opening degree of the electronic expansion valve of the indoor refrigerating unit; the air supply temperature and the air return temperature of the air conditioner, i.e., when the following 2 formulas are met:

the opening degree of the EXV of the indoor refrigerating unit$< \lambda_2 pls$, $T_{d,pre} < \xi - 2°$ C.

Alternatively, the indoor refrigerating unit may be controlled to transmit the third state signal according to the air supply temperature of the air conditioner, i.e., when the following formula is met:

$T_{d,pre} < \xi - 2°$ C., and lasting for $\varepsilon$ min or more;

where $T_{d,pre}$ represents the predicted air supply temperature.

(4) The indoor refrigerating unit may be controlled to transmit the fourth state signal according to the opening degree of the electronic expansion valve of the indoor refrigerating unit; the air return temperature of the air conditioner, the air supply temperature of the air conditioner, and the first temperature difference between the air return temperature and the air supply temperature of the air conditioner; as well as the second temperature difference between the air return temperature of the air conditioner and the set refrigerating temperature; i.e., when any one of the following 3 formulas is met:

the opening degree of the EXV of the indoor refrigerating unit$< \lambda_1 \tau_1 pls$, $T_{en} - T_{d,pre} \geq \chi + 2°$ C., $T_{en} - T_s < 1.5°$ C.

Alternatively, the indoor refrigerating unit may be controlled to transmit the fourth state signal according to the air return temperature of the air conditioner, the air supply temperature of the air conditioner, and the first temperature difference between the air return temperature and the air supply temperature of the air conditioner; as well as the second temperature difference between the air return temperature of the air conditioner and the set refrigerating temperature; i.e., when any one of the following 2 formulas is met:

$T_{en} - T_{d,pre} \geq \chi + 2°$ C., and lasting for $\varepsilon$ min or more;

$T_{en} - T_s < 1.5°$ C., where $T_{en}$ represents the air return temperature, $T_{d,pre}$ represents the predicted air supply temperature, and $T_s$ represents the set refrigerating temperature of the indoor unit.

Therefore, by matching the state parameter with each of the at least one preset state identifying strategy, the indoor refrigerating unit may be controlled to transmit the state signal according to the match result of matching the state parameter with each state identifying strategy, and the controlling method with a variable target superheat degree can adapt to a case where the temperature difference between indoor and outdoor is even larger, thereby further improving the reliability, and further expanding the operation range.

Figure 4:
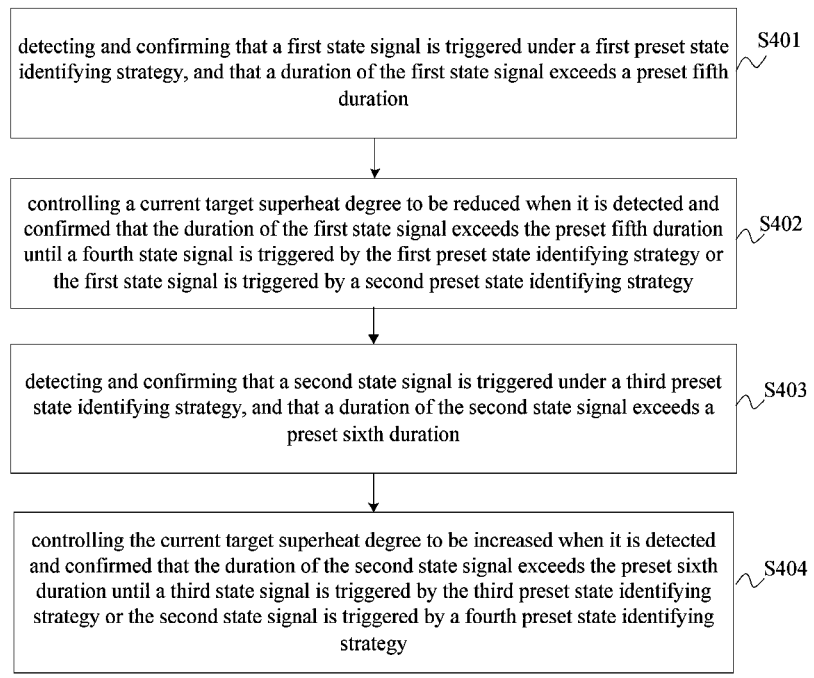
FIG. 4 is a flowchart of an air conditioner controlling method according to yet another embodiment of the present disclosure.

In an embodiment of the present disclosure, as shown in FIG. 4, the air conditioner controlling method as described above further includes the following steps.

At S401, it is detected and confirmed that a first state signal is triggered under a first preset state identifying strategy, and that a duration of the first state signal exceeds a preset fifth duration.

Specifically, the preset fifth duration may be $\varepsilon$ min, when the following 2 conditions are met, it indicates that the first state signal is triggered under the first preset state identifying strategy:

$T_{en} - T_{d,pre} < \chi - 2°$ C., and lasting for $\varepsilon$ min or more;

$T_e - T_s \geq 2°$ C.

At S402, a current target superheat degree is controlled to reduce when it is detected and confirmed that the duration of the first state signal exceeds the preset fifth duration, until a fourth state signal is triggered by the first preset state identifying strategy or the first state signal is triggered by a second preset state identifying strategy.

Figure 5:
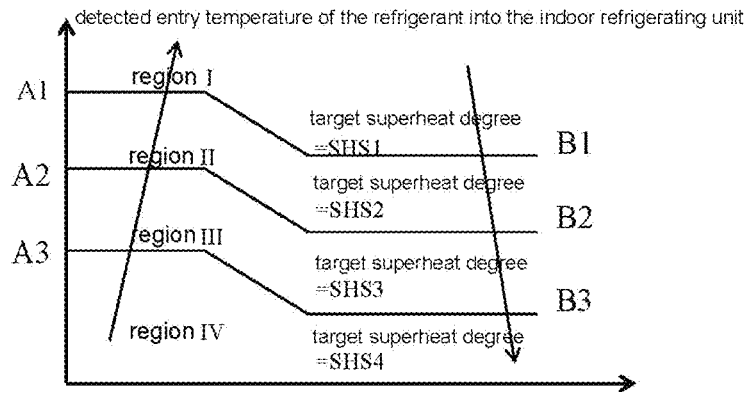
FIG. 5 is a schematic diagram showing correction logic of an indoor refrigerating unit according to an embodiment of the present disclosure.

Specifically, if the duration of the first state signal exceeds the preset fifth duration, the current target superheat degree may be controlled to reduce by 1, as shown in FIG. 5, the target superheat degree is reduced from SHS1 to SHS2, until the fourth state signal is triggered by the first preset state identifying strategy, that is:

$T_{en} - T_{d,pre} \geq \chi + 2°$ C., and lasting for $\varepsilon$ min or more;

$T_{en} - T_s < 1.5°$ C., or, until the first state signal is triggered by the second preset state identifying strategy, that is:

the opening degree of the EXV of the indoor refrigerating unit $\geq \lambda_1 pls$, $T_{en} - T_{d,pre} < \chi - 2°$ C., $T_{en} - T_s \geq 2°$ C., where $T_{en}$ represents the air return temperature, $T_{d,pre}$ represents predicted air supply temperature, and $T_s$ represents the set refrigerating temperature of the indoor unit.

At S403, it is detected and confirmed that a second state signal is triggered under a third preset state identifying strategy, and that a duration of the second state signal exceeds a preset sixth duration.

Specifically, the preset sixth duration may be $\varepsilon$ min, when the following condition is met, it indicates that the second state signal is triggered under the third preset state identifying strategy:

$T_{d,pre} \geq \xi + 2°$ C., and lasting for $\varepsilon$ min or more;

where $T_{d,pre}$ represents the predicted air supply temperature.

At S404, the current target superheat degree is controlled to increase when it is detected and confirmed that the duration of the second state signal exceeds the preset sixth duration, until a third state signal is triggered by the third preset state identifying strategy or the second state signal is triggered by a fourth preset state identifying strategy.

Specifically, if the duration of the second state signal exceeds the preset sixth duration, the current target superheat degree may be controlled to increase by 1, as shown in FIG. 5, the target superheat degree is increased from SHS4 to SHS3, until the third state signal is triggered by the third preset state identifying strategy, that is:

$T_{d,pre} < \xi - 2°$ C., and lasting for $\varepsilon$ min or more;

or, until the second state signal is triggered by the fourth preset state identifying strategy, that is:

the opening degree of the EXV of the indoor refrigerating unit $\geq \lambda_2 + \tau_2 pls$, $T_{d,pre} \geq \xi + 2°$ C., where $T_{d,pre}$ represents the predicted air supply temperature.

In an embodiment of the present disclosure, the air conditioner controlling method as described above further includes:

identifying that the state parameter is matched with each of the at least one preset state identifying strategy;

detecting and confirming that the state parameter is matched with both of the first preset state identifying strategy and the second preset state identifying strategy for triggering the first state signal, acquiring priority levels of the first preset state identifying strategy and the second preset state identifying strategy, and controlling a first state signal triggered by a state identifying strategy with a higher priority level to be transmitted;

detecting and confirming that the state parameter is matched with both of the third preset state identifying strategy and the fourth preset state identifying strategy for triggering the third state signal, acquiring priority levels of the third preset state identifying strategy and the fourth preset state identifying strategy, and controlling a third state signal triggered by a state identifying strategy with a higher priority level to be transmitted, the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

Specifically, in the matching process of the state parameter with the preset state identifying strategies, if the state parameter is matched with both of the first preset state identifying strategy and the second preset state identifying strategy for triggering the first state signal, it needs to determine the priority levels of the first preset state identifying strategy and the second preset state identifying strategy, if the priority level of the first preset state identifying strategy is higher than that of the second preset state identifying strategy, a first state signal triggered by the first preset state identifying strategy is controlled; if the priority level of the first preset state identifying strategy is lower than that of the second preset state identifying strategy, a first state signal triggered by the second preset state identifying strategy is controlled. In the matching process of the state parameter with the preset state identifying strategies, if the state parameter is matched with both of the third preset state identifying strategy and the fourth preset state identifying strategy for triggering the third state signal, it needs to determine the priority levels of the third preset state identifying strategy and the fourth preset state identifying strategy, if the priority level of the third preset state identifying strategy is higher than that of the fourth preset state identifying strategy, a third state signal triggered by the third preset state identifying strategy is controlled; if the priority level of the third preset state identifying strategy is lower than that of the fourth preset state identifying strategy, a third state signal triggered by the fourth preset state identifying strategy is controlled.

It should be noted that, the priority levels of the preset state identifying strategies need to be determined only for the trigger of the first state signal and the third state signal, while the priority levels of the preset state identifying strategies do not need to be determined for the trigger of the second state signal and the fourth state signal.

Figure 6:
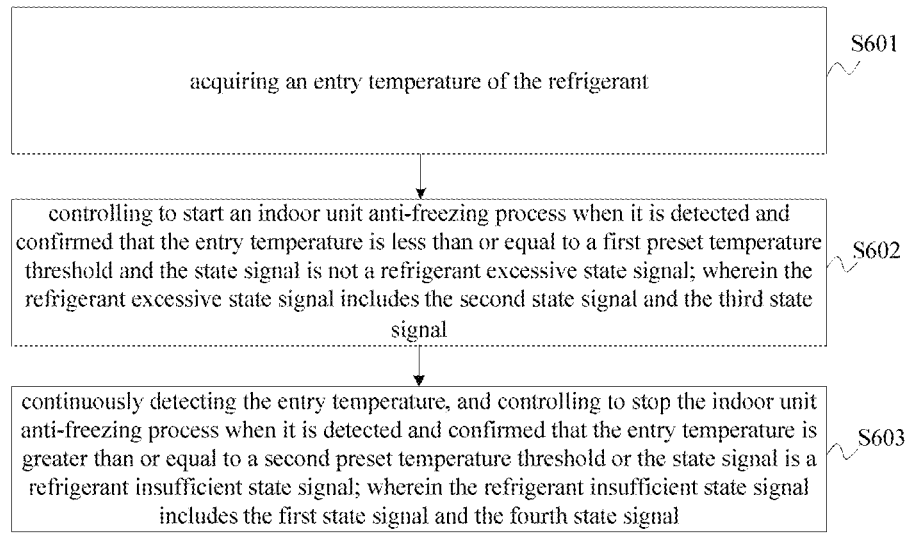
FIG. 6 is a flowchart of an air conditioner controlling method according to yet another embodiment of the present disclosure.

In an embodiment of the present disclosure, as shown in FIG. 6, the air conditioner controlling method as described above further includes the following steps.

At S601, an entry temperature of the refrigerant is required.

Whether to start an indoor unit anti-freezing controlling process may be determined according to the entry temperature and the state signal of the indoor refrigerating unit.

Specifically, in the anti-freezing control of the indoor refrigerating unit in the related art, it is commonly only based on a duration during which the entry temperature of the refrigerant is lower than a frosting point to determine whether to carry out the anti-freezing control. However, in the case of low temperature refrigeration, because low pressure is lower, an entry condition is often lower than the frosting point, and due to less refrigerant flow, the refrigerant is easy to superheat. As a result, most of the heat exchangers will be in a state higher than the frosting point, and a part of the heat exchangers which is below the frosting point is not easy to accumulate frost, either. Therefore, there is no need to perform the anti-freezing control. Further, in the case of pressure control, it is impossible to control the output of the indoor refrigerating unit when the outdoor unit is used as the evaporator in the low temperature hybrid mode and a target low pressure of the outdoor unit is taken as a control target.

Therefore, in order to better control to start or stop the indoor unit anti-freezing process, an entering speed of the refrigerant may be acquired first, and whether to start the indoor unit anti-freezing controlling process may be determined according to the entering speed of the refrigerant and the state signal of the indoor refrigerating unit.

At S602, it is controlled to start an indoor unit anti-freezing process when it is detected and confirmed that the entry temperature is less than or equal to a first preset temperature threshold and the state signal is not a refrigerant excessive state signal. The refrigerant excessive state signal includes the second state signal and the third state signal.

Specifically, that the entry temperature is less than or equal to the first preset temperature threshold needs to last for a certain period of time. The first preset temperature threshold may be −1° C.

Specifically, when the entry temperature of the refrigerant into the indoor unit≤−1° C., and the state signal is not the refrigerant excessive state signal, it may be controlled to start the indoor unit anti-freezing process.

At S603, the entry temperature is continuously detected, and it is controlled to stop the indoor unit anti-freezing process when it is detected and confirmed that the entry temperature is greater than or equal to a second preset temperature threshold or the state signal is a refrigerant insufficient state signal. The refrigerant insufficient state signal includes the first state signal and the fourth state signal.

Specifically, that the entry temperature is greater than or equal to the second preset temperature threshold needs to last for a certain period of time. The second preset temperature threshold may be σ° C.

Specifically, when the entry temperature of the refrigerant into the indoor unit≥σ° C., or the state signal is the refrigerant insufficient state signal, it may be controlled to stop the indoor unit anti-freezing process.

In an embodiment of the present disclosure, the air conditioner controlling method as described above further includes: collecting sample data, and training a predicting model constructed for predicting the air supply temperature with the sample data to obtain a target predicting model; and collecting prediction data for predicting the air supply temperature, and inputting the prediction data into the target predicting model so as to obtain the air supply temperature.

Figure 7:
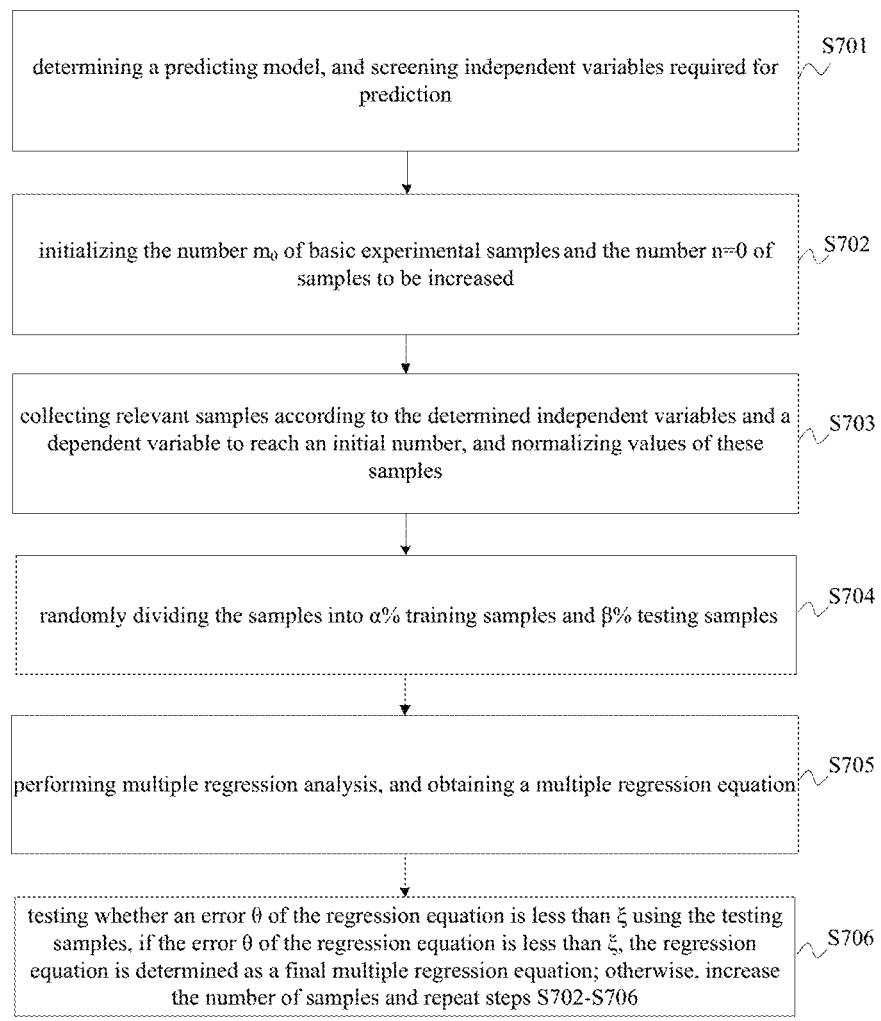
FIG. 7 is a flowchart of a method for predicting air supply temperature according to an embodiment of the present disclosure.

For example, as shown in FIG. 7, a method for predicting the air supply temperature includes the following steps.

At S701, a predicting model is determined, and independent variables required for prediction are screened.

At S702, the number $m_0$ of basic experimental samples and the number n=0 of samples to be increased are initialized.

At S703, relevant samples are collected according to the determined independent variables and a dependent variable to reach an initial number, and values of these samples are normalized.

At S704, the samples are randomly divided into α % training samples and β % testing samples.

At S705, multiple regression analysis is performed, and a multiple regression equation is obtained.

The multiple regression equation is as follows:

$$Y=\varepsilon_0+\varepsilon_1 \cdot X_1+\varepsilon_2 \cdot X_2+ \ldots +\varepsilon_n \cdot X_n.$$

At S706, whether an error θ of the regression equation is less than is tested using the testing samples, if the error θ of the regression equation is less than ξ, the regression equation is determined as a final multiple regression equation; otherwise, increase the number of samples and repeat steps S702-S706.

Specifically, the dependent variable includes the air supply temperature Y, and the independent variables include the entry temperature $X_1$ of the refrigerant, exit temperature $X_2$ of the refrigerant, temperature $X_3$ of the refrigerant in a middle part of the heat exchanger, the air return temperature $X_4$, and a nominal capacity $X_5$.

The multiple regression equation is determined as:

$$Y=\varepsilon_0+\varepsilon_1 \cdot X_1+\varepsilon_2 \cdot X_2+\varepsilon_3 \cdot X_3+\varepsilon_4 \cdot X_4+\varepsilon_5 \cdot X_5.$$

In combination with Table 1 and Table 2, there are 178 data samples in total, and the regression equation is obtained by the multiple regression analysis:

$$Y=-3.8841172169081-3.8841172169081X_1+0.543407068248543X_2+0.373026318127632X_3+0.20128670841994X_4+0.0103436792103981X_5$$

Figure 8:
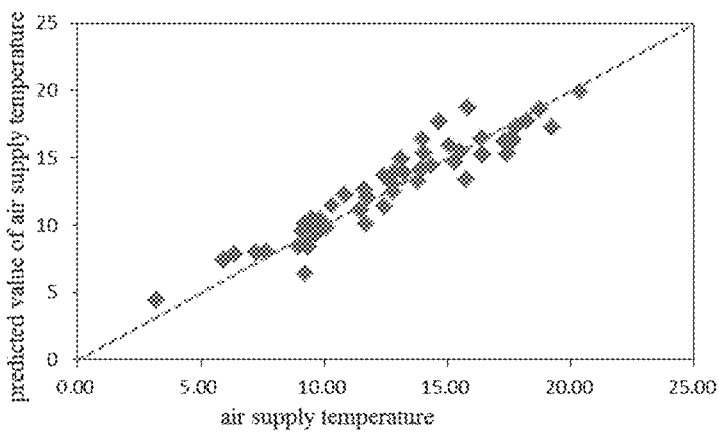
FIG. 8 is a schematic diagram showing air supply temperatures and predicted values of air supply temperature according to an embodiment of the present disclosure.
Figure 9:
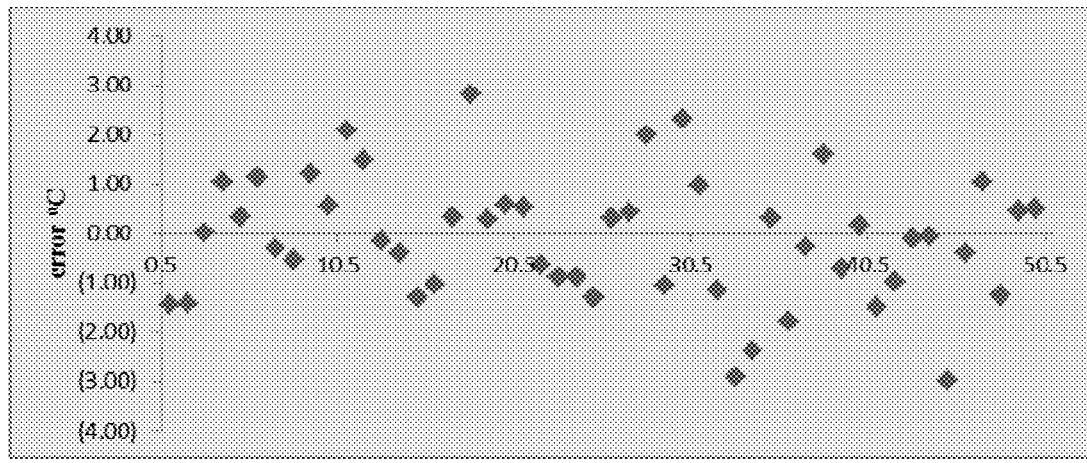
FIG. 9 is a schematic diagram showing errors of predicted values of air supply temperature according to an embodiment of the present disclosure.

Predicted values of air supply temperature are shown in FIG. 8, the error is shown in FIG. 9, and the error is ±3° C.

TABLE 1

| Air supply temperature | Entry temperature of the refrigerant | Exit temperature of the refrigerant | Temperature of the refrigerant in the middle part of the heat exchanger |
|---|---|---|---|
| Y | $X_1$ | $X_2$ | $X_3$ |
| Air return temperature | Nominal capacity | Air deflector | Entry temperature of the refrigerant at a previous moment |
| $X_4$ | $X_5$ | $X_6$ | $X_7$ |
| Exit temperature of the refrigerant at a previous moment | Temperature of the refrigerant in the middle part of the heat exchanger at a previous moment | Air return temperature at a previous moment | Air supply temperature at a previous moment (predicted value for use in the model) |
| $X_8$ | $X_9$ | $X_{10}$ | $X_{11}$ |
| ... | | | |
| ... | | | |

TABLE 2

| Y | $X_1$ | $X_2$ | $X_3$ | $X_4$ | $X_5$ | $X_6$ |
|---|---|---|---|---|---|---|
| 18.55 | −0.50 | 17.5 | 15.50 | 20.00 | 36 | 3 |
| . | . | . | . | . | . | . |
| . | . | . | . | . | . | . |
| . | . | . | . | . | . | . |
| 5.77 | −4.00 | 7.00 | 9.00 | 20.00 | 71 | 3 |

With the air conditioner controlling method according to embodiments of the present disclosure, it can be determined that the outdoor heat exchanger of the air conditioner runs in the evaporator state, the state signal of the refrigerant of the indoor refrigerating unit is acquired, and the opening degree of the electronic expansion valve of the outdoor unit is adjusted according to the state signal of the indoor refrigerating unit, thereby effectively solving the problem that target low pressure control of the outdoor unit is invalid in the case of pressure control. With the air conditioner controlling method according to embodiments of the present disclosure, the reliability of control is effectively improved, the reliable operation range of the system is broadened, and the refrigerant is reasonably distributed between the indoor refrigerating unit and the outdoor unit under the low temperature working condition.

In the following, an air conditioner controlling apparatus according to some embodiments of the present disclosure will be described with reference to the accompanying drawings.

Figure 10:
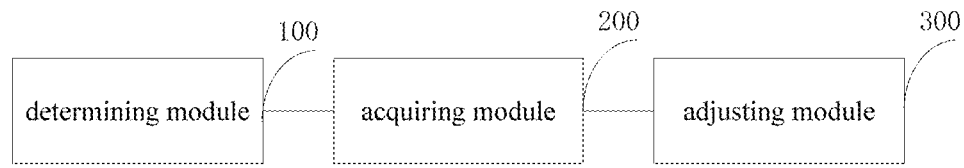
FIG. 10 is a block diagram of an air conditioner controlling apparatus according to some embodiments of the present disclosure.

FIG. 10 is a block diagram of an air conditioner controlling apparatus according to some embodiments of the present disclosure.

The air conditioner runs in a low temperature hybrid mode. As shown in FIG. 10, the air conditioner controlling apparatus includes: a determining module 100, an acquiring module 200 and an adjusting module 300.

The determining module 100 is configured to determine that an outdoor heat exchanger of the air conditioner runs in an evaporator state. The acquiring module 200 is configured to acquire a state signal of a refrigerant of an indoor refrigerating unit. The adjusting module 300 is configured to adjust an opening degree of an electronic expansion valve of an outdoor unit according to the state signal of the indoor refrigerating unit.

In an embodiment of the present disclosure, the adjusting module 300 is specifically configured to: acquire a first proportion, relative to all indoor refrigerating units, of an indoor refrigerating unit which transmits a first state signal indicating insufficient refrigerant; detect and confirm that a first duration during which the first proportion is greater than a preset first proportion threshold exceeds a preset first duration; detect and confirm that a second duration during which all indoor refrigerating units transmit a second state signal indicating excessive refrigerant exceeds a preset second duration; and control the opening degree of the electronic expansion valve of the outdoor unit to be reduced.

In an embodiment of the present disclosure, the adjusting module 300 is further configured to:

acquire a second proportion, relative to all indoor refrigerating units, of an indoor refrigerating unit which transmits a third state signal indicating excessive refrigerant, when it is detected and confirmed that the followings are not met at the same time:

the first duration during which the first proportion is greater than the preset first proportion threshold exceeds the preset first duration, and the second duration during which all indoor refrigerating units transmit the second state signal exceeds the preset second duration;

detect and confirm whether a third duration during which the second proportion is greater than a preset second proportion threshold exceeds a preset third duration;

detect and confirm that a fourth duration during which all indoor refrigerating units transmit a fourth state signal indicating insufficient refrigerant exceeds a preset fourth duration;

detect and confirm that an exhaust superheat degree of the air conditioner is greater than a preset superheat threshold; and control the opening degree of the electronic expansion valve of the outdoor unit to be increased.

In an embodiment of the present disclosure, the adjusting module 300 is further configured to:

control a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

In an embodiment of the present disclosure, the acquiring module 100 includes a parameter acquiring unit and a signal transmitting unit. The parameter acquiring unit is configured to acquire a state parameter for identifying a state of the refrigerant, and the state parameter at least includes an air supply temperature of the air conditioner. The signal transmitting unit is configured to control the indoor refrigerating unit to transmit the state signal according to the state parameter.

In an embodiment of the present disclosure, the signal transmitting unit is specifically configured to: match the state parameter with each of at least one preset state identifying strategy; and control the indoor refrigerating unit to transmit the state signal according to a match result of matching the state parameter with each state identifying strategy.

Figure 11:
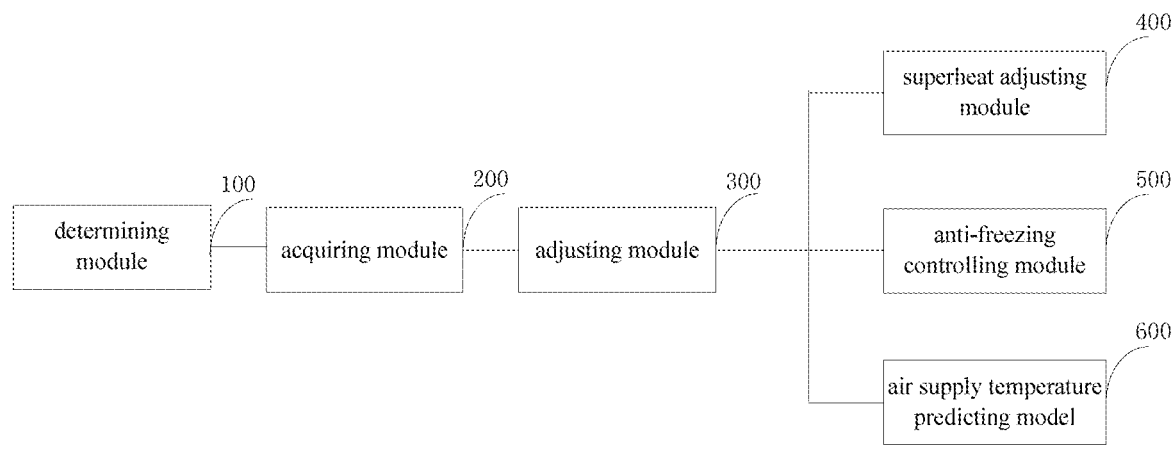
FIG. 11 is a block diagram of an air conditioner controlling apparatus according to an embodiment of the present disclosure.

Further, on the basis of the air conditioner controlling apparatus shown in FIG. 10, the air conditioner controlling apparatus as shown in FIG. 11 further includes: a superheat adjusting module 400, an anti-freezing controlling module 500, and an air supply temperature predicting model 600. The superheat adjusting module 400 is configured to:

detect and confirm that a first state signal is triggered under a first preset state identifying strategy, and that a duration of the first state signal exceeds a preset fifth duration;

control a current target superheat degree to be reduced when it is detected and confirmed that the duration of the first state signal exceeds the preset fifth duration until a fourth state signal is triggered by the first preset state identifying strategy or the first state signal is triggered by a second preset state identifying strategy;

detect and confirm that a second state signal is triggered under a third preset state identifying strategy, and that a duration of the second state signal exceeds a preset sixth duration; and control the current target superheat degree to be increased when it is detected and confirmed that the duration of the second state signal exceeds the preset sixth duration until a third state signal is triggered by the third preset state identifying strategy or the second state signal is triggered by a fourth preset state identifying strategy.

In an embodiment of the present disclosure, the signal transmitting unit is further configured to:

identify that the state parameter is matched with each of the at least one preset state identifying strategy;

detect and confirm that the state parameter is matched with both of the first preset state identifying strategy and the second preset state identifying strategy for triggering the first state signal, acquire priority levels of the first preset state identifying strategy and the second preset state identifying strategy, and control a first state signal triggered by a state identifying strategy with a higher priority level to be transmitted; or detect and confirm that the state parameter is matched with both of the third preset state identifying strategy and the fourth preset state identifying strategy for triggering the third state signal, acquire priority levels of the third preset state identifying strategy and the fourth preset state identifying strategy, and control a third state signal triggered by a state identifying strategy with a higher priority level to be transmitted, in which the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

Further, the anti-freezing controlling module 500 is configured to:

acquire an entry temperature of the refrigerant;

control to start an indoor unit anti-freezing process when it is detected and confirmed that the entry temperature is less than or equal to a first preset temperature threshold and the state signal is not a refrigerant excessive state signal;

continuously detect the entry temperature, and control to stop the indoor unit anti-freezing process when it is detected and confirmed that the entry temperature is greater than or equal to a second preset temperature threshold or the state signal is a refrigerant insufficient state signal, in which the refrigerant excessive state signal includes the second state signal and the third state signal, and the refrigerant insufficient state signal includes the first state signal and the fourth state signal.

Further, the air supply temperature predicting model 600 is configured to:

collect sample data, and train a predicting model constructed for predicting the air supply temperature with the sample data to obtain a target predicting model; and collect prediction data for predicting the air supply temperature, and input the prediction data into the target predicting model so as to obtain the air supply temperature.

It should be noted that, the explanations and illustrations made hereinbefore for embodiments regarding the air conditioner controlling method are also applicable to embodiments regarding the air conditioner controlling apparatus, which will not be elaborated here.

With the air conditioner controlling apparatus according to embodiments of the present disclosure, it is determined by the determining module that the outdoor heat exchanger of the air conditioner runs in the evaporator state, the state signal of the refrigerant of the indoor refrigerating unit is acquired by the acquiring module, and the opening degree of the electronic expansion valve of the outdoor unit is adjusted by the adjusting module according to the state signal of the indoor refrigerating unit, thereby effectively improving the reliability of control, effectively reducing costs of the indoor refrigerating unit, and efficiently save resources. Moreover, these operations are easy to be implemented.

Embodiments of the present disclosure further provide an air conditioner, which includes the air conditioner controlling apparatus as described hereinbefore.

With the air conditioner according to embodiments of the present disclosure, it can be determined by the determining module that the outdoor heat exchanger of the air conditioner runs in the evaporator state, the state signal of the refrigerant of the indoor refrigerating unit is acquired by the acquiring module, and the opening degree of the electronic expansion valve of the outdoor unit is adjusted by the adjusting module according to the state signal of the indoor refrigerating unit, thereby effectively improving the reliability of control, effectively reducing costs of the indoor refrigerating unit, and efficiently save resources. Moreover, these operations are easy to be implemented.

Embodiments of the present disclosure further provide an electronic device, including a processor; and a memory, the processor is configured to read an executable program code stored in the memory and execute a program corresponding to the executable program code, so as to implement the air conditioner controlling method as described hereinbefore.

With the electronic device according to embodiments of the present disclosure, when the program corresponding to the air conditioner controlling method stored therein is executed, the reliability of control may be effectively improved, costs of the indoor refrigerating unit may be effectively reduced, resources may be efficiently saved, and the air conditioner controlling method is easy to be implemented.

Embodiments of the present disclosure further provide a non-transitory computer-readable storage medium having stored therein a computer program that, when executed by a processor, causes the air conditioner controlling method as described hereinbefore to be performed.

With the non-transitory computer-readable storage medium according to embodiments of the present disclosure, when the program corresponding to the air conditioner controlling method stored therein is executed, the reliability of control may be effectively improved, costs of the indoor refrigerating unit may be effectively reduced, resources may be efficiently saved, and the air conditioner controlling method is easy to be implemented.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumferential" should be construed to refer to the orientation or position relationship as shown in the drawings under discussion. These relative terms are for convenience and simplification of description and do not indicate or imply that the device, apparatus or components of the present disclosure must have a particular orientation or be constructed or operated in a particular orientation, and shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly include at least one of this feature. In the description of the present disclosure, the phrase of "a plurality of" means two or more than two, such as two or three, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although embodiments of the present disclosure have been shown and described above, it would be appreciated by those skilled in the art that the above embodiments cannot be construed to limit the present disclosure, and changes, alternatives, variants and modifications can be made in the embodiments without departing from spirit, principles and scope of the present disclosure.

Although embodiments of the present disclosure have been shown and described above, it would be appreciated by those skilled in the art that the above embodiments are explanatory, illustrative, cannot be construed to limit the present disclosure, and changes, modification, alternatives and variants can be made in the embodiments without departing from the scope of the present disclosure.

What is claimed is:

1. An air conditioner controlling method, wherein the air conditioner runs in a low temperature hybrid mode, and the method comprises:
   determining that an outdoor heat exchanger of the air conditioner runs in an evaporator state;
   acquiring a state signal of a refrigerant of an indoor refrigerating unit,
   wherein the acquiring a state signal of a refrigerant of an indoor refrigerating unit comprises:
   acquiring a state parameter for identifying a state of the refrigerant; and
   controlling the indoor refrigerating unit to transmit the state signal according to the state parameter,
   wherein the state parameter at least comprises an air supply temperature of the air conditioner; and
   adjusting an opening degree of an electronic expansion valve of an outdoor unit according to the state signal of the indoor refrigerating unit,
   wherein the adjusting an opening degree of an electronic expansion valve of an outdoor unit according to the state signal of the indoor refrigerating unit comprises:
   acquiring a first proportion, relative to all indoor refrigerating units, of an indoor refrigerating unit which transmits a first state signal indicating insufficient refrigerant;
   detecting and confirming that a first duration during which the first proportion is greater than a preset first proportion threshold exceeds a preset first duration;
   detecting and confirming that a second duration during which all indoor refrigerating units transmit a second state signal indicating excessive refrigerant exceeds a preset second duration; and
   controlling the opening degree of the electronic expansion valve of the outdoor unit to be reduced.

2. The air conditioner controlling method according to claim 1, further comprising:
   acquiring a second proportion, relative to all indoor refrigerating units, of an indoor refrigerating unit which transmits a third state signal indicating excessive refrigerant, when it is detected and confirmed that the followings are not met at the same time:
   the first duration during which the first proportion is greater than the preset first proportion threshold exceeds the preset first duration, and the second duration during which all indoor refrigerating units transmit the second state signal exceeds the preset second duration;

detecting and confirming that a third duration during which the second proportion is greater than a preset second proportion threshold exceeds a preset third duration;

detecting and confirming that a fourth duration during which all indoor refrigerating units transmit a fourth state signal indicating insufficient refrigerant exceeds a preset fourth duration;

detecting and confirming that an exhaust superheat degree of the air conditioner is greater than a preset superheat threshold; and controlling the opening degree of the electronic expansion valve of the outdoor unit to be increased.

3. The air conditioner controlling method according to claim 2, further comprising:

controlling a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

4. The air conditioner controlling method according to claim 1, wherein the controlling the indoor refrigerating unit to transmit the state signal according to the state parameter comprises:

matching the state parameter with each of at least one preset state identifying strategy; and controlling the indoor refrigerating unit to transmit the state signal according to a match result of matching the state parameter with each state identifying strategy.

5. The air conditioner controlling method according to claim 4, further comprising:

detecting and confirming that a first state signal is triggered under a first preset state identifying strategy, and that a duration of the first state signal exceeds a preset fifth duration;

controlling a current target superheat degree to be reduced when it is detected and confirmed that the duration of the first state signal exceeds the preset fifth duration until a fourth state signal is triggered by the first preset state identifying strategy or the first state signal is triggered by a second preset state identifying strategy;

detecting and confirming that a second state signal is triggered under a third preset state identifying strategy, and that a duration of the second state signal exceeds a preset sixth duration; and controlling the current target superheat degree to be increased when it is detected and confirmed that the duration of the second state signal exceeds the preset sixth duration until a third state signal is triggered by the third preset state identifying strategy or the second state signal is triggered by a fourth preset state identifying strategy.

6. The air conditioner controlling method according to claim 5, further comprising:

identifying that the state parameter is matched with each of the at least one preset state identifying strategy;

detecting and confirming that the state parameter is matched with both of the first preset state identifying strategy and the second preset state identifying strategy for triggering the first state signal, acquiring priority levels of the first preset state identifying strategy and the second preset state identifying strategy, and controlling a first state signal triggered by a state identifying strategy with a higher priority level to be transmitted;

detecting and confirming that the state parameter is matched with both of the third preset state identifying strategy and the fourth preset state identifying strategy for triggering the third state signal, acquiring priority levels of the third preset state identifying strategy and the fourth preset state identifying strategy, and controlling a third state signal triggered by a state identifying strategy with a higher priority level to be transmitted, wherein the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

7. The air conditioner controlling method according to claim 1, further comprising:

acquiring an entry temperature of the refrigerant;

controlling to start an indoor unit anti-freezing process when it is detected and confirmed that the entry temperature is less than or equal to a first preset temperature threshold and the state signal is not a refrigerant excessive state signal;

continuously detecting the entry temperature, and controlling to stop the indoor unit anti-freezing process when it is detected and confirmed that the entry temperature is greater than or equal to a second preset temperature threshold or the state signal is a refrigerant insufficient state signal, wherein the refrigerant excessive state signal comprises the second state signal and the third state signal, and the refrigerant insufficient state signal comprises the first state signal and the fourth state signal.

8. The air conditioner controlling method according to claim 1, further comprising:

collecting sample data, and training a predicting model constructed for predicting the air supply temperature with the sample data to obtain a target predicting model; and collecting prediction data for predicting the air supply temperature, and inputting the prediction data into the target predicting model so as to obtain the air supply temperature.

9. An air conditioner controlling apparatus, wherein the air conditioner runs in a low temperature hybrid mode, and the apparatus comprises a processor to implement:

a determining module, configured to determine that an outdoor heat exchanger of the air conditioner runs in an evaporator state;

an acquiring module, configured to acquire a state signal of a refrigerant of an indoor refrigerating unit, wherein the acquiring module comprises:

a parameter acquiring unit, configured to acquire a state parameter for identifying a state of the refrigerant; and a signal transmitting unit, configured to control the indoor refrigerating unit to transmit the state signal according to the state parameter, wherein the state parameter at least comprises an air supply temperature of the air conditioner, and an adjusting module, configured to adjust an opening degree of an electronic expansion valve of an outdoor unit according to the state signal of the indoor refrigerating unit, wherein the adjusting module is configured to:

acquire a first proportion, relative to all indoor refrigerating units, of an indoor refrigerating unit which transmits a first state signal indicating insufficient refrigerant;

detect and confirm that a first duration during which the first proportion is greater than a preset first proportion threshold exceeds a preset first duration;

detect and confirm that a second duration during which all indoor refrigerating units transmit a second state signal indicating excessive refrigerant exceeds a preset second duration; and control the opening degree of the electronic expansion valve of the outdoor unit to be reduced.

10. The air conditioner controlling apparatus according to claim 9, wherein the adjusting module is configured to:

acquire a second proportion, relative to all indoor refrigerating units, of an indoor refrigerating unit which transmits a third state signal indicating excessive refrigerant, when it is detected and confirmed that the followings are not met at the same time:

the first duration during which the first proportion is greater than the preset first proportion threshold exceeds the preset first duration, and the second duration during which all indoor refrigerating units transmit the second state signal exceeds the preset second duration;

detect and confirm that a third duration during which the second proportion is greater than a preset second proportion threshold exceeds a preset third duration;

detect and confirm that a fourth duration during which all indoor refrigerating units transmit a fourth state signal indicating insufficient refrigerant exceeds a preset fourth duration;

detect and confirm that an exhaust superheat degree of the air conditioner is greater than a preset superheat threshold; and control the opening degree of the electronic expansion valve of the outdoor unit to be increased.

11. The air conditioner controlling apparatus according to claim 10, wherein the adjusting module is further configured to:

control a current opening degree of the electronic expansion valve of the outdoor unit to be maintained, when it is detected and confirmed that the followings are not met at the same time:

the third duration during which the second proportion is greater than the preset second proportion threshold exceeds the preset third duration, the fourth duration exceeds the preset fourth duration, and the exhaust superheat degree is greater than the preset superheat threshold.

12. The air conditioner controlling apparatus according to claim 9, wherein the signal transmitting unit is configured to:

match the state parameter with each of at least one preset state identifying strategy; and control the indoor refrigerating unit to transmit the state signal according to a match result of matching the state parameter with each state identifying strategy.

13. The air conditioner controlling apparatus according to claim 12, further comprising: a superheat adjusting module configured to:

detect and confirm that a first state signal is triggered under a first preset state identifying strategy, and that a duration of the first state signal exceeds a preset fifth duration;

control a current target superheat degree to be reduced when it is detected and confirmed that the duration of the first state signal exceeds the preset fifth duration until a fourth state signal is triggered by the first preset state identifying strategy or the first state signal is triggered by a second preset state identifying strategy;

detect and confirm that a second state signal is triggered under a third preset state identifying strategy, and that a duration of the second state signal exceeds a preset sixth duration; and control the current target superheat degree to be increased when it is detected and confirmed that the duration of the second state signal exceeds the preset sixth duration until a third state signal is triggered by the third preset state identifying strategy or the second state signal is triggered by a fourth preset state identifying strategy.

14. The air conditioner controlling apparatus according to claim 13, wherein the signal transmitting unit is further configured to:

identify that the state parameter is matched with each of the at least one preset state identifying strategy, detect and confirm that the state parameter is matched with both of the first preset state identifying strategy and the second preset state identifying strategy for triggering the first state signal, acquire priority levels of the first preset state identifying strategy and the second preset state identifying strategy, and control a first state signal triggered by a state identifying strategy with a higher priority level to be transmitted; or detect and confirm that the state parameter is matched with both of the third preset state identifying strategy and the fourth preset state identifying strategy for triggering the third state signal, acquire priority levels of the third preset state identifying strategy and the fourth preset state identifying strategy, and control a third state signal triggered by a state identifying strategy with a higher priority level to be transmitted, wherein the first preset state identifying strategy and the second preset state identifying strategy are state identifying strategies for identifying a refrigerant insufficient state, and the third preset state identifying strategy and the fourth preset state identifying strategy are state identifying strategies for identifying a refrigerant excessive state.

15. The air conditioner controlling apparatus according to claim 9, further comprising an anti-freezing controlling module, configured to:

acquire an entry temperature of the refrigerant;

control to start an indoor unit anti-freezing process when it is detected and confirmed that the entry temperature is less than or equal to a first preset temperature threshold and the state signal is not a refrigerant excessive state signal;

continuously detect the entry temperature, and control to stop the indoor unit anti-freezing process when it is detected and confirmed that the entry temperature is greater than or equal to a second preset temperature threshold or the state signal is a refrigerant insufficient state signal, wherein the refrigerant excessive state signal comprises the second state signal and the third state signal, and the refrigerant insufficient state signal comprises the first state signal and the fourth state signal.

16. The air conditioner controlling apparatus according to claim 9, further comprising: an air supply temperature predicting model, configured to:
- collect sample data, and train a predicting model constructed for predicting the air supply temperature with the sample data to obtain a target predicting model; and
- collect prediction data for predicting the air supply temperature, and input the prediction data into the target predicting model so as to obtain the air supply temperature.

17. An air conditioner, comprising an air conditioner controlling apparatus according to claim 9.

18. An electronic device, comprising:
a processor; and
a memory;
wherein the processor is configured to read an executable program code stored in the memory and execute a program corresponding to the executable program code, so as to implement an air conditioner controlling method according to claim 1.

19. A non-transitory computer-readable storage medium having stored therein a computer program that, when executed by a processor, causes an air conditioner controlling method according to claim 1 to be performed.

* * * * *